United States Patent Office 3,040,065
Patented June 19, 1962

3,040,065
PROCESS FOR THE PRODUCTION OF 8(9)-DEHYDROPROGESTERONE AND 9α-HYDROXYPROGESTERONE
William P. Schneider and Robert W. Jackson, Kalamazoo, Mich., assignors to The Upjohn Company, Kalamazoo, Mich., a corporation of Michigan
No Drawing. Filed Mar. 31, 1958, Ser. No. 724,874
2 Claims. (Cl. 260—397.3)

This invention relates to a novel compound 8(9)-dehydroprogesterone (V, below), and to methods for its preparation. It relates further to 9α-hydroxyprogesterone (IV, below), a new intermediate compound produced in the synthesis of 8(9)-dehydroprogesterone and to methods for its preparation.

The compound 8(9)-dehydroprogesterone possesses pharmacological activity, particularly of a progestational nature. This compound affects the secretion of gonadotropins and thus regulates ovulation and endometrial and placental development and, particularly when used in conjunction with "estrogens," e.g., "ethinylestradiol" and/or "androgens," e.g., "Halotestin" (9α-fluoro-11β-hydroxy-17-methyltestosterone) reduces fertility, and constitutes effective therapy for dysmenorhea, amenorrhea, endometriosis, threatened abortion and related gynecological disorders. It also has use as a general anesthetic. The novel 8(9)-dehydroprogesterone of the present invention can be used orally, topically or parenterally. Oral compositions of the invention can be prepared and administered in the form of tablets, capsules, powders or liquid suspensions. Tablets for advantageous mucosal absorption can also be made using either polyethylene glycol 4000 or 6000 as the carrier or lactose and/or sucrose as the diluent.

Both 8(9)-dehydroprogesterone and 9α-hydroxyprogesterone are chemically useful compounds. By treatment with hydrochloric or sulfuric acid they can be converted to $\Delta^{14,15}$-progesterone, which in turn can be used in the synthesis of digitoxigenin. Subjecting the 4,14-pregnadiene-3,20-dione ($\Delta^{14,15}$-progesterone) to fermentation by *Ophiobolus herpotrichus* yields 21-hydroxy 4,14-pregnadiene-3,20-dione, which by hydrogenation employing a palladium catalyst in a basic medium gives 21-hydroxy-14-pregnene-3,20-dione; esterification of this compound by conventional means is productive of 21-acyloxy-14-pregnene-3,20-dione; reducing the thus obtained 21-acyloxy-14-pregnene-3,20-dione with sodium borohydride to give 21-acyloxy-3α-hydroxy-14-pregnen-20-one; esterification of the 21-acyloxy-3α-hydroxy-14-pregnen-20-one with an arylsulfonyl chloride yields 21-acyloxy-3α-arylsulfonyloxy-14-pregnen-20-one; converting the 3α-ester to a 3β-ester by reacting it with a hydrocarbon carboxylic acid containing from one to eight carbon atoms, inclusive, in the presence of an alkali salt of the same hydrocarbon carboxylic acid to give 3β,21-diacyloxy-14-pregnen-20-one; treating the thus-produced 3β,21-diacyloxy-14-pregnen-20-one with a hypohalous acid, e.g., hypobromous acid (HBrO) or preferably a N-halohydrocarbon acid amide, for example, N-bromoacetamide in the presence of an acid to yield 3β,21-diacyloxy-15β-hydroxy-14α-bromopregnan-20-one; submitting the 3β,21-diacyloxy-15β-hydroxy-14α-bromopregnan-20-one to a Reformatsky reaction (ethyl-bromoacetate and zinc) produces 3β - acyloxy - 15β - hydroxy - 14α - bromo - 14α-card-20(22)-enolide; heating this compound with a mild base, such as sodium or potassium acetate in an organic polar solvent such as acetone, dioxane or tertiary butyl alcohol gives 3β-acyloxy-14(15)-oxido-20(22)-cardenolide; hydrolyzing the 3β-acyloxy-14(15)-oxido-20(22)-cardenolide by fermentation with *Rhizopus shanghaiensis* to yield 3β-hydroxy-14(15)-oxido-20(22)-cardenolide and treating this compound dissolved in an organic solvent, for example, dioxane with an alkali metal borohydride to reduce the 14(15)-oxido bond and thus give 3β,14β-dihydroxy-20(22)-cardenolide (digitoxigenin). Digitoxigenin is the aglycone of naturally occurring digitoxin and possesses almost equal cardiac activity.

The novel compounds of this invention are prepared from the known 9,11-dehydroprogesterone (I) [G. Rosenkranz, O. Mancera and F. Sondheimer. J. Am. Chem. Soc., 76, 2227 (1954) see p. 2230 (XIII)] and may be represented schematically by the following formulae:

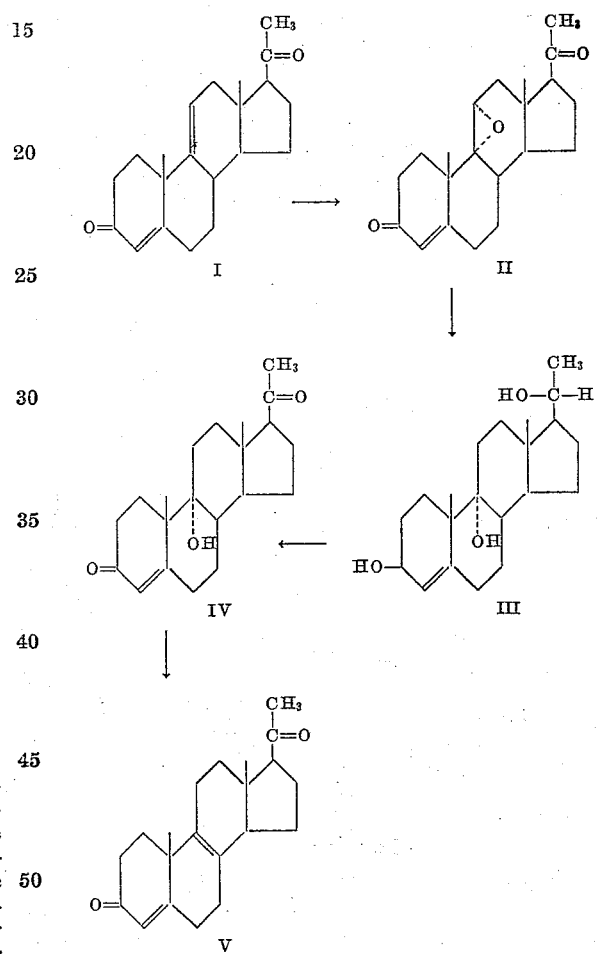

The process of the instant invention comprises reacting 9,11-dehydroprogesterone (I) with perbenzoic acid to convert the 9,11-double bond to an oxide and thus yield 9α,11α - oxido - 4 - pregnene - 3,20 - dione (II). The thus obtained 9α,11α-oxido-4-pregnene-3,20-dione (II) is thereupon treated with a reducing agent, e.g., lithium aluminum hydride dissolved in ether, to produce 3β,9α,20β-trihydroxy-4-pregnene (III). Treatment of 3β,9α,20β-trihydroxy-4-pregnene (III) with an oxidizing agent such as sodium dichromate dissolved in acetic acid yields 9α-hydroxy-4-pregnene-3,20-dione (IV). The thus obtained 9α-hydroxy-4-pregnene-3,20-dione (IV) is thereupon reacted with thionyl chloride and pyridine to yield 4,8(9) - pregnadiene - 3,20 - dione (8,9 - dehydroprogesterone) (V).

The following examples are illustrative of the process and products of the present invention, but are not to be construed as limiting.

Example 1

9α,11α-oxido-4-pregnene-3,20-dione (II) (9α,11α-oxido-progesterone)

Eighteen grams (57.6 millimoles) of 9,11-dehydroprogesterone (I) was dissolved in fifty milliliters of benzene and cooled to about ten degrees centigrade. 8.95 grams (65 millimoles) of perbenzoic acid in benzene was added to the steroid solution and the reaction mixture was held at eight degrees centigrade for six hours. At this time a one milliliter aliquot of the reaction mixture was titrated for perbenzoic acid and only a trace was found. The reaction mixture was washed with cold water containing a little sodium sulfite. The benzene solution containing the product was reduced to dryness by distilling in vacuo, giving a crude product which was dissolved in fifty milliliters of methylene chloride and chromatographed over 900 grams of Florisil, a synthetic magnesium silicate. The column was developed with 1000 milliliter fractions as follows:

Fractions 1–3; 2 percent solution of acetone in Skellysolve B (hexane hydrocarbons).
Fractions 4–7; a 5 percent solution of acetone in Skellysolve B
Fractions 8–13; a 10 percent solution of acetone in Skellysolve B
Fractions 14–23; a 15 percent solution of acetone in Skellysolve B 11.69 grams of product was eluted in fractions 18 to 23. Recrystallization from acetone and Skellysolve B gave 7.54 grams of 9α,11α-oxido-4-pregnene-3,20-dione (II). It melted at 188 to 192 degrees centigrade.

Example 2

3β,9α,20β-trihydroxy-4-pregnene (III)

10.3 grams (31.4 millimoles) of 9α,11α-oxido-4-pregnene-3,20-dione (II) was dissolved in 100 milliliters of benzene. This was added to a solution of fifteen grams of lithium aluminum hydride in 500 milliliters of anhydrous ether contained in a 1000 milliliter round bottom flask. The flask was equipped with a mechanical stirrer, dropping funnel and reflux condenser. The reaction mixture was refluxed for five hours. The excess lithium aluminum hydride was decomposed by the cautious addition of ethyl acetate and then water. The mixture was filtered and the organic layer was separated and evaporated to dryness by distilling in vacuo. 12.4 grams of the crude 3β,9α,20β-trihydroxy-4-pregnene (III) was recovered. It was not purified and was used directly for the preparation of 9α-hydroxyprogesterone.

Example 3

9α-hydroxyprogesterone (IV) (9α-hydroxy-4-pregnene-3,20-dione)

12.4 grams of 3β,9α,20β-trihydroxy-4-pregnene (III) was dissolved in 200 milliliters of glacial acetic acid. Ten grams of sodium dichromate (dihydrate) was added to the steroid solution. The reaction mixture was stirred for one hour at 25 degrees centigrade and then poured into two liters of ice and water. The excess sodium dichromate was decomposed by adding five grams of sodium sulfite. The product was collected by suction filtration and washed thoroughly on the filter with deionized water. The product was dried in vacuo at fifty degrees centigrade to constant weight. 8.4 grams of this material was recovered and purified by chromatography over 500 grams of Florisil. The product was developed with 500 milliliter fractions as follows:

Ten fractions of a fifteen percent solution of acetone in Skellysolve B.

Ten fractions of a 25 percent solution of acetone in Skellysolve B. Fractions 11 to 14, inclusive, was eluted with a 25 percent acetone solution in Skellysolve B and gave 2.27 grams. This was recrystallized from ethyl acetate and Skellysolve B to give 1.54 grams of 9α-hydroxyprogesterone (IV) with a melting point of 180 to 182 degrees centigrade and a rotation $[\alpha]_D$ of plus 141 degrees in acetone.

*Analysis.*—Calculated for $C_{21}H_{30}O_3$: C, 76.3; H, 9.15. Found: C, 76.03; H, 8.93.

Example 4

8(9) dehydroprogesterone (V) [4,8(9)-pregnadiene-3,20-dione]

1.59 grams of 9α-hydroxyprogesterone (IV) was dissolved in thirty milliliters of pyridine and cooled to zero degrees centigrade. 1.16 milliliters of thionyl chloride was added dropwise to the steroid solution at a rate that did not allow the temperature of the reaction mixture to exceed five degrees centigrade. The reaction mixture was stirred for twenty minutes at zero to five degrees centigrade and then diluted with 100 milliliters of ice water. It was left for two hours without agitation at five degrees centigrade. The product was collected by suction filtration and air dried to give 1.05 grams of a tan crystalline material. This crude product was recrystallized from ethyl acetate and Skellysolve B to give 0.81 gram of white crystalline 8(9)-dehydroprogesterone (V) with a melting point of 162 to 167 degrees centigrade and rotation $[\alpha]_D$ of plus 273 degrees in acetone.

*Analysis.*—Calculated for $C_{21}H_{28}O_2$: C, 81.0; H, 8.93. Found: C, 80.58; H, 9.23.

It is to be understood that the invention is not to be limited to the exact details of operation shown and described, as obvious modifications and equivalents will be apparent to one skilled in the art, and the invention is therefore to be limited only by the scope of the appended claims.

We claim:

1. A process for the production of 8(9)-dehydroprogesterone which comprises reacting 9α-hydroxyprogesterone with thionyl chloride and pyridine to produce 8(9)-dehydroprogesterone.

2. A process for the production of 9α-hydroxyprogesterone which comprises reacting 3β,9α,20β-trihydroxy-4-pregnene with sodium dichromate and acetic acid to produce 9α-hydroxyprogesterone.

References Cited in the file of this patent

UNITED STATES PATENTS

| | | |
|---|---|---|
| 2,409,798 | Reichstein | Oct. 22, 1946 |
| 2,712,027 | Rosenkranz et al. | June 28, 1955 |
| 2,756,179 | Fried et al. | July 24, 1956 |
| 2,840,578 | Perlman et al. | June 24, 1958 |

OTHER REFERENCES

Fieser and Fieser: Natural Products Related to Phenanthrene 3rd edition (1949), p. 277.

Fried et al: "Recent Progress in Hormone Research," vol. XI, pp. 155 and 156 (1955).

Eppstein et al: "Vitamins and Hormones," vol. XIV, pp. 388 and 389 (1956).